(12) United States Patent
Li

(10) Patent No.: US 12,451,950 B2
(45) Date of Patent: Oct. 21, 2025

(54) METHOD FOR BEAM FAILURE DETECTION, AND TERMINAL DEVICE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 537 days.

(21) Appl. No.: 17/915,896

(22) PCT Filed: Apr. 9, 2020

(86) PCT No.: PCT/CN2020/083873
§ 371 (c)(1),
(2) Date: Sep. 29, 2022

(87) PCT Pub. No.: WO2021/203342
PCT Pub. Date: Oct. 14, 2021

(65) Prior Publication Data
US 2023/0143378 A1 May 11, 2023

(51) Int. Cl.
*H04B 7/06* (2006.01)
*H04L 5/00* (2006.01)
*H04W 24/08* (2009.01)
*H04W 72/12* (2023.01)
*H04W 72/21* (2023.01)

(52) U.S. Cl.
CPC ....... *H04B 7/06964* (2023.05); *H04L 5/0048* (2013.01); *H04L 5/0053* (2013.01); *H04W 24/08* (2013.01); *H04W 72/12* (2013.01); *H04W 72/21* (2023.01)

(58) Field of Classification Search
CPC ..... H04W 24/08; H04W 72/12; H04W 72/21; H04W 24/04; H04W 72/0446; H04W 72/1268; H04L 5/0048; H04L 5/0053; H04L 5/005; H04L 5/0092; H04B 7/088; H04B 7/0695
See application file for complete search history.

(56) References Cited

U.S. PATENT DOCUMENTS

2019/0190582 A1* 6/2019 Guo ............... H04L 1/0061
2021/0028843 A1* 1/2021 Zhou ............. H04L 5/0053
(Continued)

FOREIGN PATENT DOCUMENTS

CN 110831041 A 2/2020
CN 110945897 A 3/2020
(Continued)

OTHER PUBLICATIONS

Indian Patent Application No. 202247063191, Office Action dated Jan. 19, 2023, 6 pages.
(Continued)

*Primary Examiner* — Habte Mered
(74) *Attorney, Agent, or Firm* — Cozen O'Connor

(57) ABSTRACT

A method for beam failure detection in a mobile communication network is performed by terminal device that determines a target reference signal resource used for beam failure detection of a first neighboring cell in the network; and performs beam failure detection on the first neighboring cell based on the target reference signal resource. A terminal device is also provided.

18 Claims, 3 Drawing Sheets determining a target reference signal resource for a beam failure detection of a first neighboring cell — 301 performing the beam failure detection on the first neighboring cell based on the target reference signal resource — 302

(56) References Cited

U.S. PATENT DOCUMENTS

2021/0227613 A1* 7/2021 Zhang ................... H04L 5/006
2022/0386203 A1* 12/2022 Jassal ................... H04W 16/28

FOREIGN PATENT DOCUMENTS

| EP | 3509373 A1 | 7/2019 |
| EP | 3525516 A1 | 8/2019 |
| WO | WO 2019214713 A1 | 11/2019 |
| WO | WO 2020012619 A1 | 1/2020 |

OTHER PUBLICATIONS

European Patent Application No. 20929767.0, Search and Opinion dated Dec. 15, 2023, 10 pages.
Japanese Patent Application No. 2022-560050, Office Action dated Jan. 9, 2024, 5 pages.
Japanese Patent Application No. 2022-560050, English translation of Office Action dated Jan. 9, 2024, 5 pages.
Mediatek Inc. "Physical layer feasibility considerations for mobility enhancement" 3GPP TSG RAN WG1 Meeting RAN #98, R1-1908392, Aug. 2019, 12 pages.
Intel Corporation "Summary 3 on SCell BFR and L1-SINR" 3GPP TSG RAN WG1 Meeting #96b, R1-1905844, Apr. 2019, 24 pages.
Chinese Patent Application No. 202080000705.7, Office Action dated Aug. 16, 2022, 7 pages.
Chinese Patent Application No. 202080000705.7, English translation of Office Action dated Aug. 16, 2022, 9 pages.

* cited by examiner

METHOD FOR BEAM FAILURE DETECTION, AND TERMINAL DEVICE

CROSS-REFERENCE TO RELATED APPLICATION

This application is the US national phase application of International Application No. PCT/CN2020/083873, filed on Apr. 9, 2020, the entire contents of which are incorporated herein by reference for all purposes.

TECHNICAL FIELD

The disclosure relates to a field of communication technologies, in particular to a method, an apparatus and a device for beam failure detection, and a readable storage medium.

BACKGROUND

In mobile communication networks referred to as 5G, or New Radio (NR), when a communication frequency band is within Frequency Range (FR) 2, beam-based sending and receiving is required to ensure coverage due to fast attenuation of high frequency channels.

In the related art, a corresponding beam configured to a User Equipment (UE) for sending and receiving Physical Downlink Control Channel (PDCCH) may experience interference when this UE moves, or when an antenna direction is rotated. This is known as a beam failure.

Currently, there is no method for beam failure detection of neighboring cells.

SUMMARY

According to an aspect of the disclosure, a method for beam failure detection applied to a terminal device is provided. The method includes:
  determining a target reference signal resource for a beam failure detection of a first neighboring cell; and
  performing the beam failure detection on the first neighboring cell based on the target reference signal resource.

In another aspect, a method for beam failure detection applied to a network device is provided. The method includes:
  sending a configuration signaling to a terminal, in which the configuration signaling includes a target information field, and the target information field is configured to indicate a time-frequency resource location for receiving a target reference signal resource, and the target reference signal resource is configured for the terminal to perform a beam failure detection on a first neighboring cell.

In another aspect, a terminal device is provided. The terminal device includes:
  a processor;
  a transceiver connected to the processor; in which,
  the processor is configured to load and execute executable instructions to implement the method for beam failure detection according to the above embodiments.

In another aspect, a network device is provided. The network device includes:
  a processor;
  a transceiver connected to the processor; in which,
  the processor is configured to load and execute executable instructions to implement the method for beam failure detection according to the above embodiments.

BRIEF DESCRIPTION OF THE DRAWINGS

In order to clearly illustrate technical solutions of embodiments of the disclosure, a brief description of drawings used in embodiments is given below. Obviously, the drawings in the following descriptions are only part of the embodiments of the disclosure, and for those skilled in the art, other drawings can be obtained according to these drawings without inventive works.

DETAILED DESCRIPTION

In order to make the objectives, technical solutions and advantages of the disclosure clearer, the embodiments of the disclosure will be further described in detail below with reference to the accompanying drawings.

Figure 1:
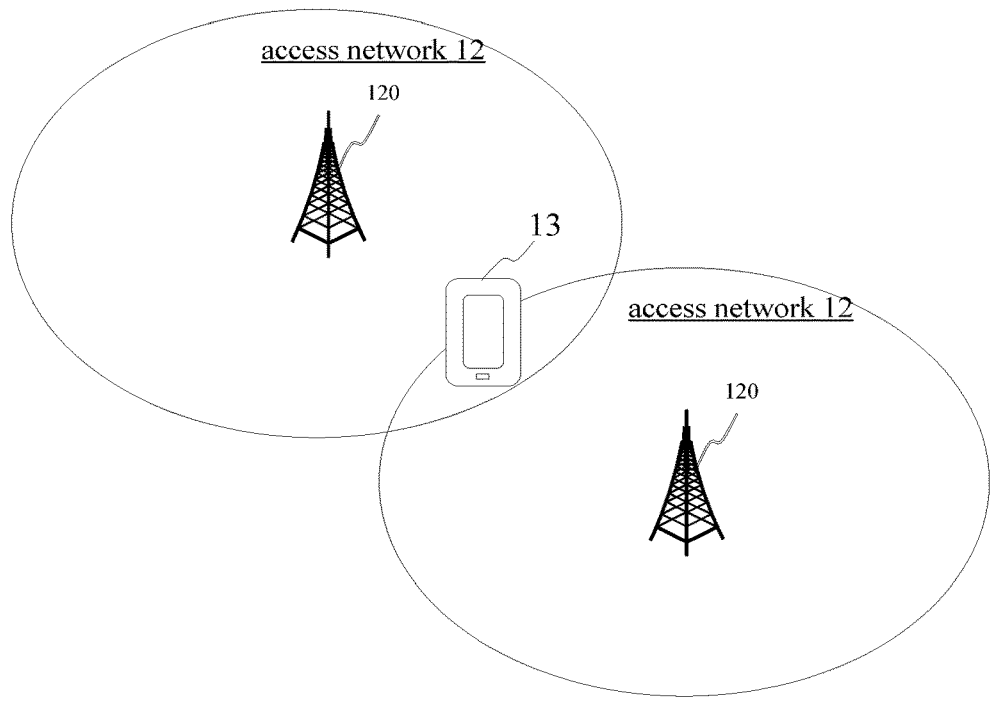
FIG. 1 is a schematic diagram of a communication system according to an exemplary embodiment of the disclosure.

FIG. 1 is a block diagram of a communication system according to an exemplary embodiment of the disclosure. The communication system may include: an access network 12 and a terminal device 14.

The access network 12 includes a plurality of network devices 120. The network device 120 may be base station, which is a device deployed in the access network to provide wireless communication functions for terminal devices. The base station may include different types of macro base stations, micro base stations, relay stations, and access points. In systems using different radio access technologies, the name of the device having the function of the base station may vary, for example, eNodeB or eNB in the Long Term Evolution (LTE) system, and gNodeB or gNB in 5G NR-U system. The description "base station" may change as communication technology evolves. For ease of description, the above devices that provide the wireless communication function to the terminal device 14 are collectively referred to as network device.

The terminal device 14 may include a variety of devices that have wireless communication capabilities, such as handheld devices, in-vehicle devices, wearable devices, computing devices or other processing devices connected to a wireless modem, and various forms of user devices, Mobile Stations (MSs), and terminal devices. For ease of description, the devices mentioned above are collectively referred to as the terminal device. The network device 120 and the terminal device 14 communicate with each other via a certain radio technology, e.g., a Uu interface.

The technical solutions of the disclosure can be applied to various communication systems, such as, Global System of Mobile Communication (GSM) system, Code Division Multiple Access (CDMA) system, Wideband Code Division Multiple Access (WCDMA) system, General Packet Radio Service (GPRS), LTE system, LTE Frequency Division Duplex (FDD) system, LTE Time Division Duplex (TDD) system, Advanced Long Term Evolution (LTE-A) system, NR system, evolutionary system based on the NR system, LTE-based access to Unlicensed spectrum (LTE-U) system, NR-U system, Universal Mobile Telecommunication System (UMTS), Worldwide Interoperability for Microwave Access (WiMAX) communication system, Wireless Local Area Networks (WLAN), Wireless Fidelity (WiFi), next generation communication system and other communication systems.

Generally, traditional communication systems support a limited number of connections and are easy to implement. However, with the development of communication technologies, mobile communication systems will not only support traditional communication, but also support, for example, Device to Device (D2D) communication, Machine to Machine (M2M) communication, Machine Type Communication (MTC), Vehicle to Vehicle (V2V) communication and Vehicle to Everything (V2X) system. Embodiments of the disclosure can also be applied to these communication systems.

In a 5G NR system, the above-mentioned network devices 120 may be replaced with N Transmission Reception Points (TRPs).

Figure 2:
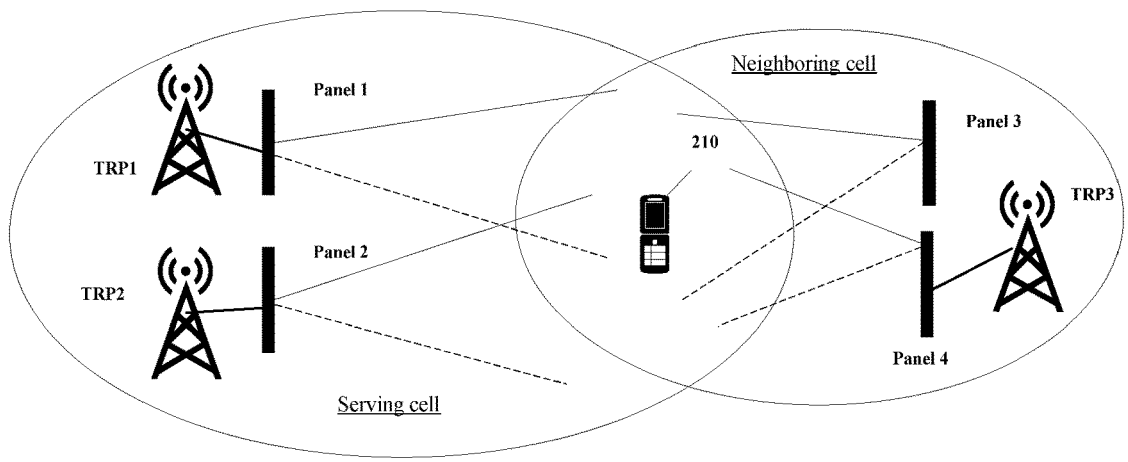
FIG. 2 is a schematic diagram of data transmission based on multiple Transmission/Reception Points or multiple antenna panels (multi-TRP/panel) according to an exemplary embodiment of the disclosure.

FIG. 2 is a schematic diagram of data transmission based on multiple TRPs or multiple antenna panels (multi-TRP/panel) according to an exemplary embodiment of the disclosure.

The terminal device 210 is located in a serving cell, and also in a neighboring cell.

Each cell may be covered by more than one TRP. As illustrated in FIG. 1, the serving cell is covered by TRP1 and TRP2 jointly, and thus a coverage radius of the serving cell is increased. The neighboring cell is covered by TRP3.

Each TRP may have more than one antenna panel. Different antenna panels may be oriented differently to receive or send beams in/from different transmission directions, so as to realize multiple spatial diversity. The network device may use multiple panels (these panels may be from the same TRP or different TRPs) to send PDCCH to a terminal device 210 simultaneously. In this case, the transmission directions of different panels are different, so the terminal device 210 also needs to use different panels to receive the PDCCH, then the network device needs to indicate different Transmission Configuration Indication (TCI) states to the terminal device, and each TCI state corresponds to one receiving beam direction on each panel of the terminal device. With the beam-based sending and receiving method described above, coverage can be guaranteed.

When the terminal device 210 moves to an edge of a cell, it is possible that the performance of the serving cell measured on panel#1 is good and the performance of the neighboring cell measured on panel#2 is good, then the throughput is not optimal if the terminal device 210 continues to stay in the serving cell or switches to the neighboring cell, since the terminal may be at an overlap location of an overlap area between the two cells. Then, the optimal approach is that different cells simultaneously transmit data with the terminal device 210 based on beams and the beams are switchable dynamically. Also, since communication between different cells causes delay, inter-cell multi-TRP serves the terminal device 210 by using multi-Downlink Control Information (DCI) signaling, also known as the multi-DCI mode, in which each cell sends its own DCI to schedule channel transmissions such as Physical Downlink Shared Channel (PDSCH)) or Physical Uplink Shared Channel (PUSCH)), that is, the neighboring cell also needs to send DCI signaling to the terminal, in which the DCI signaling is sent through Physical Downlink Control Channel (PDCCH).

In detail, the network device can indicate the TCI state by signaling, to inform the terminal device 210 of a receiving beam to be used for reception. Each TCI state corresponds to a Reference Signal (RS) identifier. The RS may be either a non-zero power Channel State Information Reference Signal (CSI-RS), a Synchronization Signal Block (SSB) or a Sounding Reference Signal (SRS).

Figure 3:
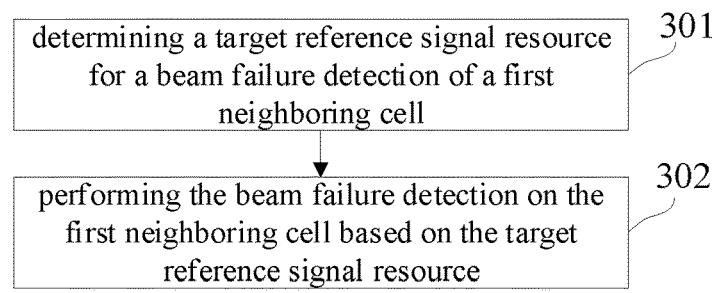
FIG. 3 is a flowchart of a method for beam failure detection applied to a terminal device according to an exemplary embodiment of the disclosure.

FIG. 3 is a flowchart of a method for beam failure detection according to an exemplary embodiment of the disclosure. The method is illustrated as an example applied to a terminal device as shown in FIG. 1. As illustrated in FIG. 3, the method includes the following.

At step 301, a target reference signal resource for beam failure detection of a first neighboring cell is determined.

The target reference signal resource may be a reference signal resource specifically configured by the base station to the terminal device for beam failure detection of the first neighboring cell, or a default reference signal resource.

The reference signal resource configured by the base station and default reference signal resource are described respectively.

Firstly, the time-frequency resource location of the target reference signal resource is configured by the base station to the terminal device. The terminal device receives a configuration instruction. The configuration instruction includes a target information field. The target information field is configured to indicate the time-frequency resource location for receiving the target reference signal resource. The target reference signal resource includes one or more reference resource, and the terminal device detects the target reference resource at the time-frequency resource location indicated by the configuration instruction according to the configuration instruction.

In a possible implementation, the configuration instruction is an instruction sent by the base station in the serving cell where the terminal device is located to the terminal device. The configuration instruction may be a Radio Resource Control (RRC) signaling, that is, the base station in the serving cell configures the RS resource used to detect a beam failure in the first neighboring cell via the RRC signaling. In some embodiments, during the RS resource configuration process, the base station also needs to inform the terminal device of the information required to receive the RS resource. For example, the information may be one or more of a first neighboring cell ID (which may be a physical cell ID, or a cell number of the first neighboring cell among the plurality of serving cells and/or neighboring cells that provide services to the terminal), RS ID, RS type, and the time-frequency resource location corresponding to the RS.

Secondly, the target reference signal resource includes the default reference signal resource. In some embodiments, when the base station in the serving cell has not configured the RS resource for the terminal device to perform beam failure detection on the first neighboring cell, the terminal device uses the default RS resource. In some embodiments, the default RS resource includes the RS resource corresponding to a TCI state used when the terminal receives a Control Resource Set (CORESET) sent by the first neighboring cell. In a possible implementation, each CORESET corresponds to a TCI state and each TCI state corresponds to an RS resource.

In a possible implementation, when the terminal device determines the receiving beam based on the TCI state, the base station informs the terminal device of at least one TCI state through the RRC signaling, which includes an identifier of the TCI state and its corresponding RS type and RS ID. The receiving beam used by the terminal device to receive the PDCCH is the same as the receiving beam used when the receiving power is the strongest when receiving the RS corresponding to the TCI state. That is, the TCI state is used to instruct the terminal device to receive a PDCCH or PDSCH using the same receiving beam that is used to receive the target RS sent by the base station; or to instruct the terminal device to send a PUCCH or PUSCH using the same sending beam that is used to send the target RS.

In some embodiments, when the terminal device is configured to receive n CORESETs of the first neighboring cell, the terminal device determines m CORESETs of the n CORESETs of the first neighboring cell and determines RS resources corresponding to TCI states of the m CORESETs as the default RS resources, in which m and n are both positive integers and m is less than n.

In some embodiments, the terminal device selects the RS resources corresponding to the TCI states of the m CORESETs with the smallest CORESET ID from the n CORESETs for beam failure detection.

At step 302, a beam failure detection is performed on the first neighboring cell based on the target reference signal resource.

In response to the channel quality of the target reference signal resource being below a first threshold, it is determined that a beam failure occurs in the first neighboring cell.

In some embodiments, when the UE detects that the channel qualities of all the target RS resources of the first neighboring cell that need to be detected are below the first threshold, it is determined that a beam failure occurs in the first neighboring cell.

In some embodiments, the channel quality includes Layer 1 Reference Signal Receiving Power (L1-RSRP), and/or, the channel quality includes Layer 1 Signal-to-Interference and Noise Ratio (L1-SINR).

In some embodiments, when the UE detects a beam failure in the first neighboring cell, the UE detects candidate RS resources corresponding to candidate beams of the first neighboring cell according to the configuration of the base station. In response to a Reference Signal Receiving Power (RSRP) of a first candidate RS resource in the candidate RS resources corresponding to the candidate beams reaching a second threshold, the UE uses a candidate beam direction corresponding to the first candidate RS resource as a new beam direction of the first neighboring cell.

In conclusion, according to the method for beam failure detection of the embodiments of the disclosure, a method for beam failure detection for neighboring cells is provided by enabling beam failure detection of the terminal for neighboring cells through configured target RS resources or default RS resources.

Figure 4:
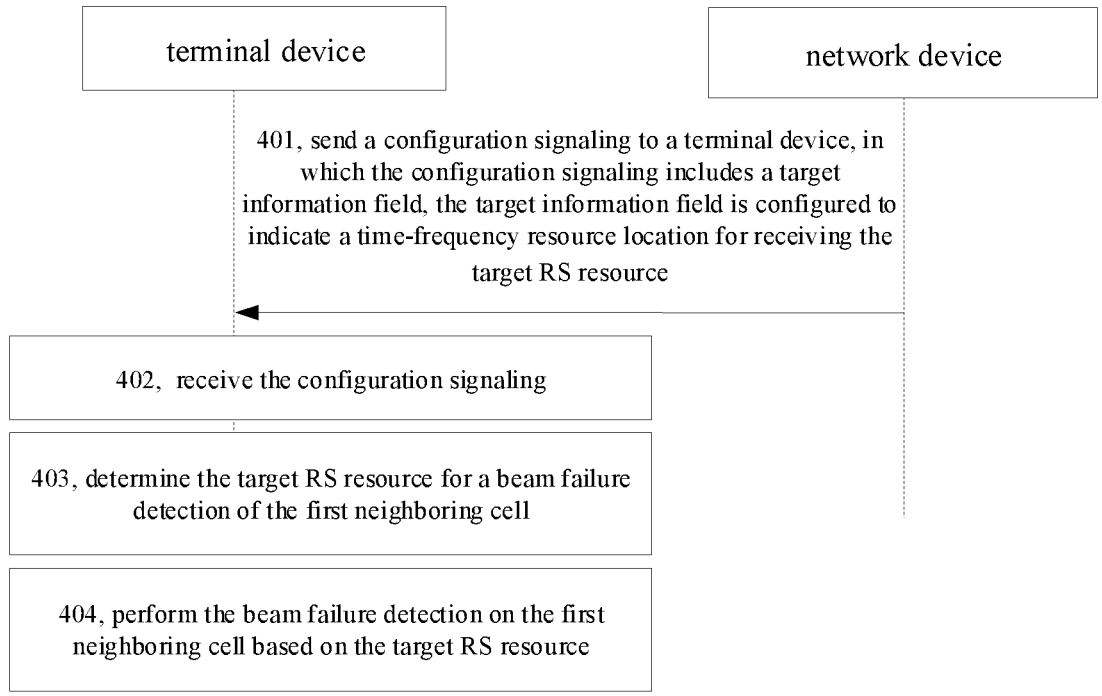
FIG. 4 is a flowchart of a method for beam failure detection applied to a terminal device and a network device according to another exemplary embodiment of the disclosure.

FIG. 4 is a flowchart of a method for beam failure detection according to another exemplary embodiment of the disclosure. The method is illustrated as an example applied to a terminal device and a network device as shown in FIG. 1. As illustrated in FIG. 4, the method includes the following.

At step 401, a network device sends a configuration signaling to a terminal device, in which the configuration signaling includes a target information field, the target information field is configured to indicate a time-frequency resource location for receiving a target RS resource.

In some embodiments, the target RS resource is used by the terminal to perform a beam failure detection on the first neighboring cell.

In some embodiments, the network device may be a base station in the serving cell where the terminal device is located. The base station configures the target RS resource to the terminal device.

In some embodiments, the configuration instruction may be a RRC signaling. That is, the base station in the serving cell configures the RS resource for beam failure detection of the first neighboring cell through the RRC signaling. In some embodiments, during the RS resource configuration process, the base station also needs to inform the terminal of the information required to receive the RS resource. For example, the information may be one or more of a first neighboring cell ID, RS ID, RS type, and the time-frequency resource location corresponding to the RS.

At step 402, the terminal device receives the configuration signaling.

In some embodiments, the target RS resource includes one or more RS resources.

At step 403, the terminal device determines the target RS resource used for beam failure detection of the first neighboring cell.

The terminal device receives the target RS resource according to the time-frequency resource location indicated in the configuration signaling.

At step 404, the terminal device performs the beam failure detection on the first neighboring cell based on the target RS resource.

In response to the channel quality of the target RS resource being below the first threshold, it is determined that a beam failure occurs in the first neighboring cell.

In some embodiments, when the UE detects that the channel qualities of all the target RS resources of the first neighboring cell that need to be detected are below the first threshold, it is determined that a beam failure occurs in the first neighboring cell.

In some embodiments, when the UE detects a beam failure in the first neighboring cell, the UE detects the candidate RS resources corresponding to the candidate beams of the first neighboring cell according to the configuration of the base station. In response to the RSRP of the first candidate RS resource among the candidate RS resources corresponding to the candidate beams reaching the second threshold, the candidate beam direction corresponding to the first candidate RS resource is used as the new beam direction of the first neighboring cell.

In conclusion, according to the method for beam failure detection of the embodiments of the disclosure, a method for beam failure detection for neighboring cells is provided by enabling beam failure detection for the neighboring cells through configured target RS resources or default RS resources.

Figure 5:
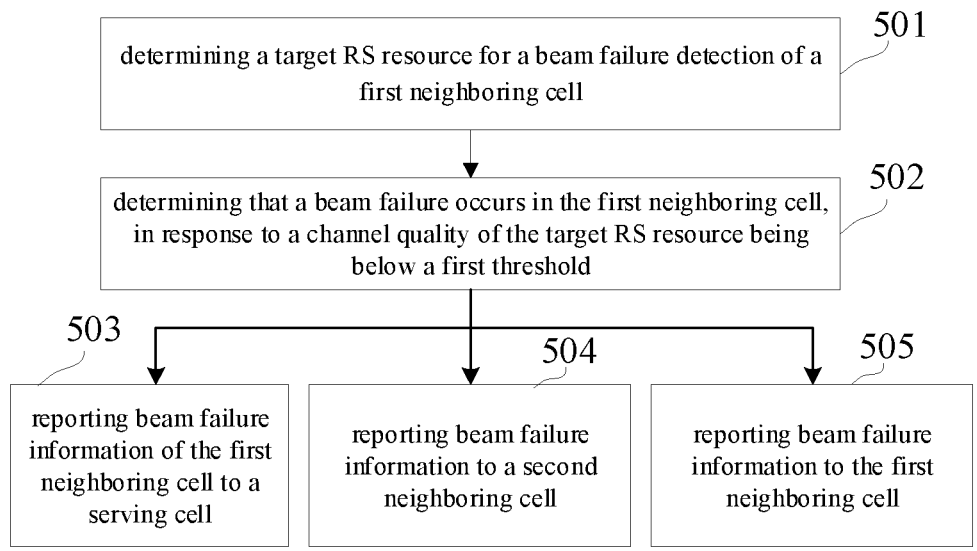
FIG. 5 is a flowchart of another method for beam failure detection applied to a terminal device according to another exemplary embodiment of the disclosure.

In an optional embodiment, the UE is also required to report beam failure information to the network device when the UE detects a beam failure in the first neighboring cell. FIG. 5 is a flowchart of a method for reporting a beam failure according to another exemplary embodiment of the disclosure. The method is illustrated as an example applied to a terminal device. As illustrated in FIG. 5, the method further includes the following.

At step 501, a target reference signal resource for beam failure detection of a first neighboring cell is determined.

The target reference signal resources may be a reference signal resource specifically configured by the base station to the terminal device for beam failure detection of the first neighboring cell, or may be a default reference signal resource.

The reference signal resource configured by the base station and the default reference signal resource are described respectively.

Firstly, the time-frequency resource location of the target reference signal resource is configured by the base station to the terminal device. The terminal device receives a configuration instruction. The configuration instruction includes a target information field. The target information field is configured to indicate the time-frequency resource location for receiving the target reference signal resource.

Secondly, the target reference signal resource includes the default reference signal resource.

At step 502, it is determined that a beam failure occurs in the first neighboring cell, in response to a channel quality of the target RS resource being below a first threshold.

In some embodiments, when the UE detects that the channel qualities of all the target RS resources in the first neighboring cell that need to be detected are below the first threshold, it is determined that a beam failure occurs in the first neighboring cell.

At step 503, beam failure information of the first neighboring cell is reported to a serving cell.

The serving cell includes a Primary Cell (PCell), or a Primary Secondary Cell (PScell) or a Secondary Cell (SCell) configured with a PUCCH.

At step 504, the beam failure information is reported to a second neighboring cell.

The second neighboring cell is a primary neighboring cell or a primary secondary neighboring cell. For example, there are several neighboring cells that provide service to the terminal and one of the neighboring cells is set as the primary neighboring cell or the primary secondary neighboring cell of the terminal.

It is worth noting that, for the above step 503 and step 504, it is possible to perform only step 503, or only step 504, or both step 503 and step 504.

In some embodiments, the beam failure information may be reported after detecting a beam failure in the first neighboring cell, or after detecting a beam failure in the first neighboring cell and detecting a new beam direction of the first neighboring cell. When the beam failure information is reported directly after detecting the beam failure in the first neighboring cell, the beam failure information is configured to indicate that a beam failure occurs in the first neighboring cell. When the beam failure information is reported after detecting the new beam direction of the first neighboring cell, the beam failure information is configured to indicate that a beam failure occurs in the first neighboring cell and the new beam direction of the first neighboring cell.

In some embodiments, the beam failure information may be reported through the PUCCH or through the PUSCH.

Reporting the beam failure information through the PUCCH and reporting the beam failure information through the PUSCH are described below respectively.

Firstly, the beam failure information is reported through the PUCCH.

In some embodiments, when the beam failure information is reported through the PUCCH, the beam failure information is configured to indicate that a beam failure occurs in the first neighboring cell. The way of reporting a beam failure in the first neighboring cell may be the same as or different from the way of reporting a beam failure in the serving cell.

When the way of reporting a beam failure in the first neighboring cell is the same as the way of reporting a beam failure in the serving cell, during the reporting of the beam failure in the serving cell, a Scheduling Request (SR) for Beam Failure Recovery (BFR) in the PUCCH is used for reporting the beam failure in the first neighboring cell. In this case, the scheduling request used to report a beam failure in the first neighboring cell and the scheduling request used to report a beam failure in the serving cell have the same time-frequency domain resource and the same codeword indication mode. That is, the same SR is used for reporting a beam failure in the first neighboring cell and reporting a beam failure in the serving cell.

When the way of reporting a beam failure in the first neighboring cell is different from the way of reporting a beam failure in the serving cell, differences include at least one of the following.

1) The SR used for reporting a beam failure in the first neighboring cell and the SR used for reporting a beam failure in the serving cell have different time-frequency domain resources.

That is, the time-domain resource of the SR used for reporting a beam failure in the first neighboring cell is different from the time-domain resource of the SR used for reporting a beam failure in the serving cell; and/or, the frequency-domain resource of the SR used for reporting a beam failure in the first neighboring cell is different from the frequency-domain resource of the SR for reporting a beam failure in the serving cell.

2) The SR used for reporting a beam failure in the first neighboring cell and the SR used for reporting a beam failure in the serving cell have different codeword indication modes.

In some embodiments, the SR includes an indication field. When this indication field has a first value, the indication field is configured to indicate that a beam failure occurs in a neighboring cell. When this indication field has a second value, it indicates that a beam failure occurs in a serving cell. That is, an indication field is added to an original SR codeword to distinguish whether the indicated object of the SR is the serving cell or the neighboring cell.

For example, if this indication field is 1 bit, when the indication field takes the value of 1, it means that the SR indicates that a beam failure occurs in the neighboring cell, and when the indication field takes the value of 0, it means that the SR indicates that a beam failure occurs in the serving cell.

In some embodiments, when there is resource collision between the SR for BFR of the serving cell and the SR for BFR of the first neighboring cell, and beam failure can be indicated by only 1 bit, then the SR for the serving cell is sent preferentially.

For example, if this indication field is 2 bit, when the indication field takes the value of 00, it indicates that there is uplink data to be sent. When the indication field takes the value of 01, it indicates that a beam failure occurs in the serving cell. When the indication field takes the value of 10, it indicates that a beam failure occurs in a neighboring cell. When the indication field takes the value of 11, it indicates that there is uplink data to be sent and a beam failure occurs in the serving cell and/or neighboring cell.

Secondly, the beam failure information is reported through the PUSCH.

In some embodiments, when the beam failure information is reported through the PUSCH, the beam failure information is configured to indicate the cell number of the first neighboring cell, that is, the cell number of the first neighboring cell in which the beam failure occurs is reported through the PUSCH. In some embodiments, an indication signaling is sent through the PUSCH, the indication signaling including the cell number of the first neighboring cell in which the beam failure occurs. In some embodiments, the cell number of the first neighboring cell where the beam failure occurs is sent through a Media Access Control (MAC) Control Element (CE) signaling on the PUSCH.

In some embodiments, the neighboring cells and the serving cell are numbered jointly. Or, the neighboring cells and the serving cell are numbered independently.

When the neighboring cells and the serving cell are numbered jointly, a cell number of the first neighboring cell is determined from the joint numbers of the serving cell and the neighboring cells. Or, when the neighboring cells and the serving cell are numbered independently, a cell number of the first neighboring cell is determined from independent numbers of the neighboring cells.

For example, when the neighboring cells and the serving cell are numbered jointly, the neighboring cells also use the Scell number to take the values 1, 2, 3, . . . in turn. When the serving cell and the neighboring cells are numbered independently, the numbers of the neighboring cells take the values 0, 1, 2, 3, . . . in turn according to Neighboring Cell (NCell) numbers.

In some embodiments, when reporting the beam failure information through the PUSCH, the cell number of the first neighboring cell may be reported through the PUSCH after determining that a beam failure occurs in the first neighboring cell, that is, the cell number of the first neighboring cell is included in the above indication signaling. Or, it is possible to report the cell number of the first neighboring cell through the PUSCH and indicate the new beam direction of the first neighboring cell after determining that a beam failure occurs in the first neighboring cell and determining the new beam direction of the first neighboring cell. Or, it is also possible to report the cell number of the first neighboring cell through the PUSCH and indicate that there is no new beam direction, when determining that a beam failure occurs in the first neighboring cell.

The terminal detects the candidate RS resources corresponding to the candidate beams of the first neighboring cell when detecting that a beam failure occurs in the first neighboring cell. In response to the RSRP corresponding to the first candidate RS resource reaching the second threshold, the new beam direction indication information is reported through the PUSCH, the new beam direction indication information including a RS resource number corresponding to the first candidate RS resource; or, the new beam direction indication information is reported through the PUSCH, the new beam direction indication information indicating that there is no new beam direction. In some embodiments, when no candidate RS resource with a RSRP reaching the second threshold is detected in detecting the candidate RS resources corresponding to the candidate beams of the first neighboring cell, then the new beam direction indication information is configured to indicate that there is no new beam direction.

At step 505, the beam failure information is reported to the first neighboring cell.

In some embodiments, when reporting the beam failure information to the first neighboring cell, the beam failure information may be reported to the first neighboring cell through a Physical Random Access Channel (PRACH). The beam failure information is configured to indicate that a beam failure occurs in the first neighboring cell. In some embodiments, after detecting that a beam failure occurs in the first neighboring cell, the terminal detects the candidate RS resources corresponding to the candidate beams of the first neighboring cell, and when a RSRP corresponding to a second candidate RS resource reaches the second threshold, the terminal sends a corresponding random access preamble on a PRACH time-frequency resource according to the RRACH time-frequency resource corresponding to this RS resource, that is, send the beam failure information to indicate that a beam failure occurs in the first neighboring cell.

In some embodiments, the above second candidate RS resource and the first candidate RS resource may be the same candidate RS resource or may be different candidate RS resources, which is not limited in embodiments of this disclosure.

In some embodiments, when the beam failure information is reported to the first neighboring cell and uplink and downlink channels between the terminal device and the network device are asymmetrical, the information may be reported through the PUCCH or PUSCH. When the uplink and downlink channels between the terminal device and the network device are symmetric, reporting the beam failure information though the PUCCH or PUSCH will fail due to beam failure.

In conclusion, according to the method for beam failure detection of the embodiments of the disclosure, a method for beam failure detection for neighboring cells is provided by enabling beam failure detection of the neighboring cells through configured target RS resources or default RS resources.

According to the method of the embodiments of the disclosure, the beam failure information is reported through the PUCCH or PUSCH, so that the network device in the serving cell or the network device in the neighboring cell can receive the beam failure information of the neighboring cell, and can know the beam failure occurring in the neighboring cell, and thus can realize BFR.

Figure 6:
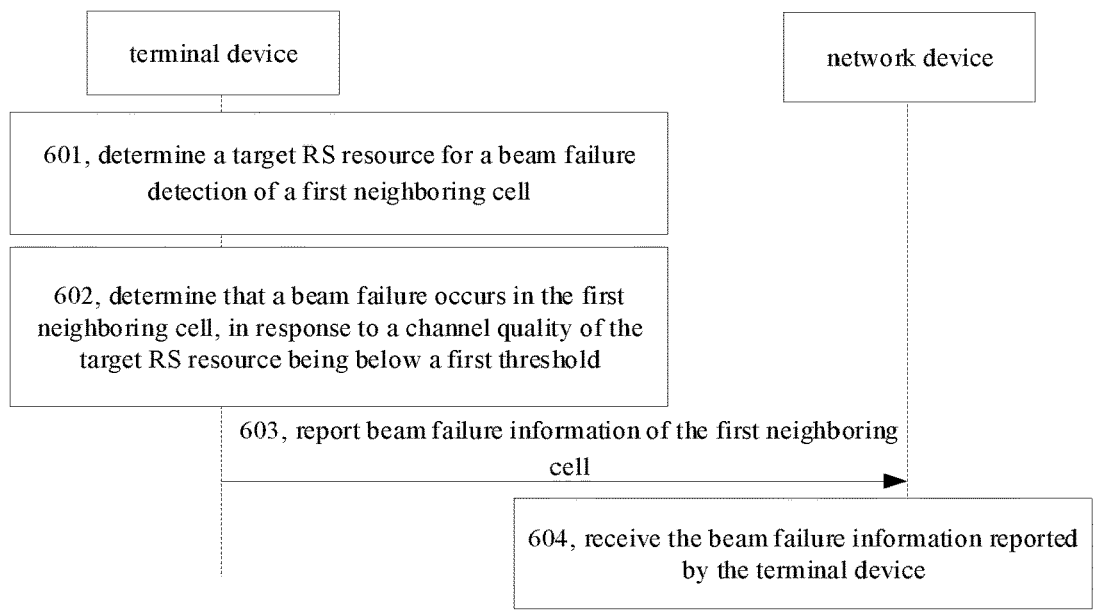
FIG. 6 is a flowchart of another method for beam failure detection applied to a terminal device and a network device according to another exemplary embodiment of the disclosure.

FIG. 6 is a flowchart of a method for beam failure detection according to another exemplary embodiment of the disclosure. The method is illustrated as an example applied to a terminal device and a network device shown in FIG. 1. As illustrated in FIG. 6, the method further includes the following.

At step 601, a terminal device determines a target reference signal resource for beam failure detection of a first neighboring cell.

The target reference signal resource may be a reference signal resource specifically configured by the base station to the terminal device for beam failure detection of the first neighboring cell, or a default reference signal resource.

At step 602, the terminal device determines that a beam failure occurs in the first neighboring cell, in response to a channel quality of the target reference signal resource being below a first threshold.

In some embodiments, when the UE detects that the channel qualities of all the target RS resources of the first neighboring cell that need to be detected are below the first threshold, it is determined that a beam failure occurs in the first neighboring cell.

At step 603, the terminal device reports beam failure information of the first neighboring cell.

In some embodiments, the terminal device may report the beam failure information of the first neighboring cell to the network device of the serving cell, or to the network device of the neighboring cell, or to both the network device of the serving cell and the network device of the neighboring cell. The terminal device may report the beam failure information to the first neighboring cell itself, and may also report the beam failure information to the second neighboring cell.

At step 604, the network device receives the beam failure information reported by the terminal device.

In some embodiments, the network device may be a network device corresponding to a serving cell of the terminal device or a network device corresponding to a neighboring cell of the terminal device.

In some embodiments, when the beam failure information is received, and the network device is the network device of the serving cell, or the network device of the second neighboring cell, the beam failure information may be received through the PUCCH or PUSCH.

Receiving the beam failure information through the PUCCH and receiving the beam failure information through the PUSCH are described separately.

First, receiving the beam failure information through the PUCCH.

Reporting is performed through a SR for BFR in the PUCCH. The scheduling request used for reporting the beam failure in the first neighboring cell and the scheduling request used for reporting the beam failure in the serving cell have the same time-frequency domain resource and the same codeword indication mode. Or, the scheduling request used for reporting the beam failure in the first neighboring cell and the scheduling request used for reporting the beam failure in the serving cell have different time-frequency domain resources. Or, the scheduling request used for reporting the beam failure in the first neighboring cell and the scheduling request used for reporting the beam failure in the serving cell have different codeword indication modes.

Second, receiving the beam failure information through the PUSCH

In some embodiments, an indication signaling is received from the PUSCH, and the indication signaling includes the cell number of the first neighboring cell in which a beam failure occurs.

In some embodiments, the neighboring cells and the serving cell are numbered jointly. Or, the neighboring cells and the serving cell are numbered independently.

When the neighboring cells and the serving cell are numbered jointly, the first neighboring cell corresponding to the cell number indicated in the indication signaling is determined from the joint numbers. Or, when the neighboring cells and the serving cell are numbered independently, the first neighboring cell corresponding to the cell number indicated in the indication signaling is determined from the independent numbers of neighboring cells.

In some embodiments, the indication signaling further includes the new beam direction indication information. The new beam direction indication information includes the RS resource number of the first candidate RS resource, the first candidate RS resource is a candidate signal resource whose RSRP reaches the second threshold. Or, the new beam direction indication information is configured to indicate that there is no new beam direction for the first neighboring cell, that is, it is detected that no RSRP of any of the candidate RS resources reaches the second threshold.

In some embodiments, when the network device is the network device of the first neighboring cell, it can receive the beam failure information through the PRACH, and the beam failure information is configured to indicate that a beam failure occurs between the first neighboring cell itself and the terminal device.

In conclusion, according to the method for beam failure detection of the embodiments of the disclosure, a method for beam failure detection for neighboring cells is provided by enabling beam failure detection of the neighboring cells through configured target RS resources or default RS resources.

According to the method provided by this embodiment, the beam failure information is reported through the PUCCH or PUSCH, so that the network device of the serving cell or the network device of the neighboring cell can receive the beam failure information of the neighboring cell, can know the beam failure occurring in the neighboring cell, thereby realizing BFR.

Figure 7:
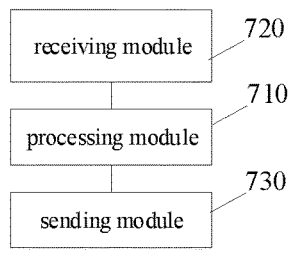
FIG. 7 is a block diagram of an apparatus for beam failure detection according to an exemplary embodiment of the disclosure.

FIG. 7 is a block diagram of an apparatus for beam failure detection according to an exemplary embodiment of the disclosure. The apparatus is applied in a terminal device as an example. The apparatus includes a processing module 710.

The processing module 710 is configured to determine a target RS resource for beam failure detection of a first neighboring cell.

The processing module 710 is further configured to perform a beam failure detection on the first neighboring cell based on the target RS resource.

In an optional embodiment, the apparatus further includes a receiving module 720.

The receiving module 720 is configured to receive a configuration signaling. The configuration signaling includes a target information field, the target information field is configured to indicate a time-frequency resource location for receiving the target RS resource, and the target RS resource includes one or more RS resources.

In an optional embodiment, the target RS resource includes a default RS resource, and the default RS resource includes a RS resource corresponding to a TCI state of a CORESET of the first neighboring cell.

In an optional embodiment, the processing module 710 is further configured to: determine m CORESETs of n CORESETs of the first neighboring cell; and determine RS resources corresponding to TCI states of the m CORESETs as the default RS resources, in which m and n are both positive integers and m is less than n.

In an optional embodiment, the processing module 710 is further configured to: determine that a beam failure occurs in the first neighboring cell, in response to a channel quality of the target RS resource being below a first threshold.

In an optional embodiment, the apparatus further includes: a sending module 730, and the sending module 730 is configured to:

report beam failure information of the first neighboring cell to a serving cell;

and/or, report beam failure information of the first neighboring cell to a second neighboring cell.

In an optional embodiment, the processing module 710 is further configured to: report the beam failure information through a PUCCH;

and/or, report the beam failure information through a PUSCH.

In an optional embodiment, the sending module 730 is further configured to: report the beam failure information through a SR for BFR in the PUCCH.

In an optional embodiment, the SR used for reporting the beam failure of the first neighboring cell and the SR used for reporting the beam failure of the serving cell have the same time-frequency domain resource and the same codeword indication mode.

In an optional embodiment, the SR used for reporting the beam failure of the first neighboring cell and the SR used for reporting the beam failure of the serving cell have different time-frequency domain resources;

or, the SR used for reporting the beam failure of the first neighboring cell and the SR used for reporting the beam failure of the serving cell have different codeword indication modes.

In an optional embodiment, the sending module 730 is further configured to: report a cell number of the first neighboring cell where a beam failure occurs through the PUSCH.

In an optional embodiment, the processing module 710 is further configured to: determine the cell number of the first neighboring cell from joint numbers of the serving cell and neighboring cells;

or, determine the cell number of the first neighboring cell from independent numbers of the neighboring cells.

In an optional embodiment, the sending module 730 is further configured to: detect candidate RS resources corresponding to candidate beams of the first neighboring cell.

The sending module 730 is further configured to: report new beam direction indication information through the PUSCH, in response to detecting a RSRP corresponding to a first candidate RS resource reaching a second threshold, in which the new beam direction indication information includes a RS resource number corresponding to the first candidate RS resource; or, report new beam direction indication information through the PUSCH, in response to detecting no candidate RS resource whose RSRP reaches a second threshold, in which the new beam direction indication information includes an information field for indicating that there is no new beam direction.

In an optional embodiment, the sending module 730 is further configured to: report beam failure information to the first neighboring cell.

In an optional embodiment, the sending module 730 is further configured to: report the beam failure information to the first neighboring cell through a PRACH.

Figure 8:
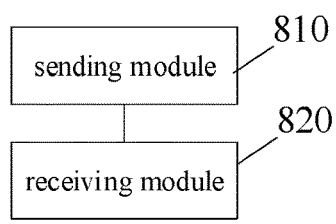
FIG. 8 is a block diagram of an apparatus for beam failure detection according to another exemplary embodiment of the disclosure.

FIG. 8 is a block diagram of an apparatus for beam failure detection according to an exemplary embodiment of the disclosure. The apparatus is applied in a network device as an example. The apparatus includes: a sending module 810.

The sending module 810 is configured to send a configuration signaling to a terminal, in which the configuration signaling includes a target information field, and the target information field is configured to indicate a time-frequency resource location for receiving a target RS resource, and the target RS resource is configured for the terminal to perform a beam failure detection on a first neighboring cell.

In an optional embodiment, the apparatus further includes: a receiving module 820.

The receiving module 820 is configured to receive beam failure information reported by the terminal, in which the beam failure information is configured to indicate that a beam failure occurs in the first neighboring cell.

In an optional embodiment, the receiving module 820 is further configured to: receive the beam failure information through a PUCCH;

and/or, receive the beam failure information through a PUSCH.

In an optional embodiment, the receiving module 820 is further configured to: receive a SR for BFR through the PUCCH, in which the SR includes the beam failure information.

In an optional embodiment, the SR used for reporting the beam failure of the first neighboring cell and the SR used for reporting the beam failure of the serving cell have the same time-frequency domain resource and the same codeword indication mode.

In an optional embodiment, the SR used for reporting the beam failure of the first neighboring cell and the SR used for reporting the beam failure of the serving cell have different time-frequency resource locations;

or, the SR used for reporting the beam failure of the first neighboring cell and the SR used for reporting the beam failure of the serving cell have different codeword indication modes.

In an optional embodiment, the receiving module 820 is further configured to: receive an indication signaling through the PUSCH, in which the indication signaling includes a cell number of the first neighboring cell where a beam failure occurs.

In an optional embodiment, the indication signaling further includes new beam direction indication information.

The new beam direction indication information includes a RS resource number of a first candidate RS resource, in which the first candidate RS resource is a candidate signal resource whose RSRP reaches a second threshold; or, the new beam direction indication information is configured to indicate that there is no new beam direction.

In conclusion, according to the method for beam failure detection of the embodiments of the disclosure, a method for beam failure detection for neighboring cells is provided by enabling beam failure detection of the neighboring cells through configured target RS resources or default RS resources.

Figure 9:
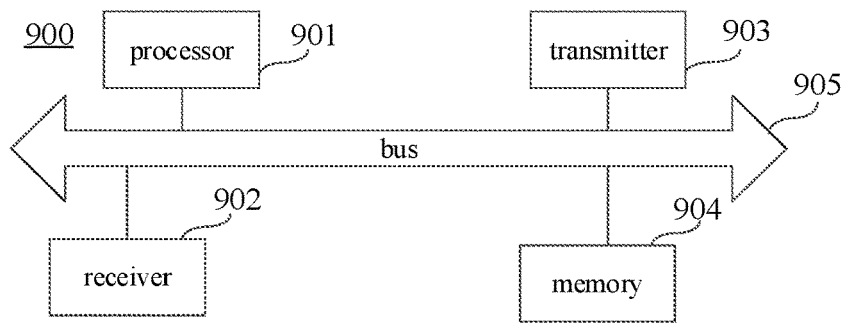
FIG. 9 is a block diagram of a communication device according to an exemplary embodiment of the disclosure.

FIG. 9 is a block diagram of a communication device (terminal device or network device) 900 according to an exemplary embodiment of the disclosure. The communication device 900 includes: a processor 901, a receiver 902, a transmitter 903, a memory 904 and a bus 905.

The processor 901 includes one or more processing cores, and the processor 901 performs various functional applications and information processing by running software programs and modules.

The receiver 902 and transmitter 903 may be implemented as a communication component, which may be a communication chip.

The memory 904 is connected to the processor 901 by the bus 905.

The memory 904 may be used to store at least one instruction and the processor 901 is used to execute the at least one instruction, to implement the various steps in the method embodiments described above.

In addition, the memory 904 may be implemented by any type of volatile or non-volatile storage device or a combination thereof, including but not limited to: disk or disc, Electrically Erasable Programmable Read Only Memory (EEPROM), Erasable Programmable Read Only Memory (EPROM), Static Random Access Memory (SRAM), Read- Only Memory (ROM), magnetic memory, flash memory, and Programmable Read-Only Memory (PROM).

An exemplary embodiment of the disclosure further provides a system for beam failure detection, the system includes: a terminal device and a network device.

The terminal device includes an apparatus for beam failure detection as provided in the embodiment shown in FIG. 7.

The network device includes an apparatus for beam failure detection as provided in the embodiment shown in FIG. 8.

An exemplary embodiment of the disclosure also provides a computer readable storage medium. The computer readable storage medium is stored with at least one instruction, and at least one program, code set or instruction set, and the at least one instruction and the at least one program, code set or instruction set are configured to be loaded and executed by a processor to implement steps of the method for beam failure detection according to any one of the method embodiments and executed by a terminal.

It should be understood that "plurality" mentioned in the disclosure refers to two or more. The term "and/or" describes the association relationship of the associated objects, indicating that there can be three types of relationships, for example, A and/or B, which means that A exists alone, A and B exist at the same time, and B exists alone. The character "/" generally indicates that the associated objects before and after are in an "or" relationship.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. The protection scope claimed by the disclosure is limited only by the appended claims.

What is claimed is:

1. A method for beam failure detection, comprising:
   determining, by a terminal device, a target reference signal resource for a beam failure detection of a first neighboring cell; and
   performing, by the terminal device, the beam failure detection on the first neighboring cell based on the target reference signal resource;
   wherein the target reference signal resource comprises a default reference signal resource, and the default reference signal resource comprises a reference signal resource corresponding to a Transmission Configuration Indication (TCI) state of a control resource set of the first neighboring cell;
   wherein determining the target reference signal resource for the beam failure detection of the first neighboring cell, comprises: determining m control resource sets of n control resource sets of the first neighboring cell; and determining reference signal resources corresponding to TCI states of the m control resource sets as the default reference signal resource, wherein m and n are both positive integers and m is less than n.

2. The method of claim 1, wherein determining the target reference signal resource for the beam failure detection of the first neighboring cell comprises:
   receiving a configuration signaling, wherein the configuration signaling comprises a target information field, the target information field is configured to indicate a time-frequency resource location for receiving the target reference signal resource, and the target reference signal resource comprises one or more reference signal resources.

3. The method of claim 1, wherein performing the beam failure detection on the first neighboring cell based on the target reference signal resource comprises:
   determining that a beam failure occurs in the first neighboring cell, in response to a channel quality of the target reference signal resource being below a first threshold.

4. The method of claim 3, further comprising at least one of:
   reporting beam failure information of the first neighboring cell to a serving cell;
   or,
   reporting beam failure information of the first neighboring cell to a second neighboring cell.

5. The method of claim 4, further comprising at least one of:
   reporting the beam failure information through a Physical Uplink Control Channel (PUCCH);
   or,
   reporting the beam failure information through a Physical Uplink Shared Channel (PUSCH).

6. The method of claim 5, wherein reporting the beam failure information through the PUCCH, comprises:
   reporting the beam failure information through a scheduling request for beam failure recovery in the PUCCH.

7. The method of claim 6, wherein
   a scheduling request used to report a beam failure of the first neighboring cell and a scheduling request used to report a beam failure of the serving cell have a same time-frequency domain resource and a same codeword indication mode;
   or,
   a scheduling request used to report a beam failure of the first neighboring cell and a scheduling request used to report a beam failure of the serving cell have different time-frequency domain resources;
   or,
   a scheduling request used to report a beam failure of the first neighboring cell and a scheduling request used to report a beam failure of the serving cell have different codeword indication modes.

8. The method of claim 5, wherein reporting the beam failure information through the PUSCH comprises:
   reporting a cell number of the first neighboring cell where a beam failure occurs through the PUSCH.

9. The method of claim 8, further comprising:
   determining the cell number of the first neighboring cell from joint numbers of the serving cell and neighboring cells;
   or,
   determining the cell number of the first neighboring cell from independent numbers of neighboring cells.

10. The method of claim 8, further comprising:
    detecting candidate reference signal resources corresponding to candidate beams of the first neighboring cell; and
    reporting new beam direction indication information through the PUSCH, in response to a reference signal receiving power corresponding to a first candidate reference signal resource reaching a second threshold, wherein the new beam direction indication information comprises a reference signal resource number corresponding to the first candidate reference signal resource; or, reporting new beam direction indication information through the PUSCH, in response to detecting no candidate reference signal resource with a reference signal receiving power reaching a second threshold, wherein the new beam direction indication information comprises an information field for indicating that there is no new beam direction.

11. The method of claim 3, further comprising:
reporting beam failure information to the first neighboring cell.

12. The method of claim 11, wherein reporting the beam failure information to the first neighboring cell comprises:
reporting the beam failure information to the first neighboring cell through a Physical Random Access Channel (PRACH).

13. A method for beam failure detection, comprising:
sending by a network device, a configuration signaling to a terminal, wherein the configuration signaling comprises a target information field, and the target information field is configured to indicate a time-frequency resource location for receiving a target reference signal resource, and the target reference signal resource is configured for the terminal to perform beam failure detection on a first neighboring cell;
wherein the target reference signal resource comprises a default reference signal resource, and the default reference signal resource comprises a reference signal resource corresponding to a Transmission Configuration Indication (TCI) state of a control resource set of the first neighboring cell;
wherein m control resource sets of n control resource sets of the first neighboring cell are determined, and reference signal resources corresponding to TCI states of the m control resource sets are determined as the default reference signal resource, wherein m and n are both positive integers and m is less than n.

14. The method of claim 13, further comprising:
receiving beam failure information reported by the terminal, wherein the beam failure information is configured to indicate that a beam failure occurs in the first neighboring cell.

15. The method of claim 14, further comprising:
receiving the beam failure information through a Physical Uplink Control Channel (PUCCH);
and/or,
receiving the beam failure information through a Physical Uplink Shared Channel (PUSCH).

16. The method of claim 15, wherein receiving the beam failure information through the PUCCH comprises:
receiving a scheduling request for beam failure recovery through the PUCCH, wherein the scheduling request comprises the beam failure information.

17. The method of claim 15, wherein receiving the beam failure information through the PUSCH comprises:
receiving an indication signaling through the PUSCH, wherein the indication signaling comprises a cell number of the first neighboring cell where a beam failure occurs;
wherein the indication signaling further comprises new beam direction indication information, and
the new beam direction indication information comprises a reference signal resource number of a first candidate reference signal resource, wherein the first candidate reference resource is a candidate signal resource whose reference signal receiving power reaches a second threshold; or, the new beam direction indication information is configured to indicate that there is no new beam direction.

18. A terminal device, comprising:
a processor;
a transceiver connected to the processor; wherein,
the processor is configured to:
determine a target reference signal resource for a beam failure detection of a first neighboring cell; and
perform the beam failure detection on the first neighboring cell based on the target reference signal resource;
wherein the target reference signal resource comprises a default reference signal resource, and the default reference signal resource comprises a reference signal resource corresponding to a Transmission Configuration Indication (TCI) state of a control resource set of the first neighboring cell; and
wherein the processor is further configured to determine the target reference signal resource for the beam failure detection of a first neighboring cell by: determining m control resource sets of n control resource sets of the first neighboring cell; and determining reference signal resources corresponding to TCI states of the m control resource sets as the default reference signal resource, wherein m and n are both positive integers and m is less than n.

* * * * *